US012638549B2

(12) United States Patent
Ewert

(10) Patent No.: US 12,638,549 B2
(45) Date of Patent: May 26, 2026

(54) METHOD OF TRAINING A MACHINE LEARNING SYSTEM FOR AN OBJECT RECOGNITION DEVICE

(71) Applicant: Robert Bosch GmbH, Stuttgart (DE)

(72) Inventor: Marlon Ramon Ewert, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 944 days.

(21) Appl. No.: 17/083,839

(22) Filed: Oct. 29, 2020

(65) Prior Publication Data

US 2021/0142216 A1      May 13, 2021

(30) Foreign Application Priority Data

Nov. 7, 2019      (DE) .......................... 102019217225.3

(51) Int. Cl.
| | |
|---|---|
| *G06N 20/00* | (2019.01) |
| *G01S 7/40* | (2006.01) |
| *G01S 7/41* | (2006.01) |
| *G06V 10/80* | (2022.01) |
| *G06V 20/56* | (2022.01) |
| *G01S 7/48* | (2006.01) |
| *G01S 7/539* | (2006.01) |

(52) U.S. Cl.
CPC ............ *G01S 7/4052* (2013.01); *G06N 20/00* (2019.01); *G06V 10/803* (2022.01); *G06V 10/806* (2022.01); *G06V 10/809* (2022.01); *G06V 20/56* (2022.01); *G01S 7/412* (2013.01); *G01S 7/4802* (2013.01); *G01S 7/539* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 10,828,959 B2 * | 11/2020 | Duan | ....................... | B60H 3/00 |
| 11,861,458 B2 * | 1/2024 | Clément | ............... | B60W 40/02 |
| 2012/0254208 A1 * | 10/2012 | Duvoisin, III | ........ | G01S 13/885 |
| | | | | 707/E17.014 |
| 2013/0332113 A1 * | 12/2013 | Piemonte | ................ | G01S 19/39 |
| | | | | 702/189 |
| 2015/0310041 A1 * | 10/2015 | Kier | ........................ | A63F 13/90 |
| | | | | 463/33 |
| 2017/0193667 A1 * | 7/2017 | Shotton | ................... | G06F 3/011 |
| 2019/0132709 A1 * | 5/2019 | Graefe | ................... | H04W 4/46 |

(Continued)

FOREIGN PATENT DOCUMENTS

| | | |
|---|---|---|
| CN | 107784151 A | 3/2018 |
| CN | 109427214 A | 3/2019 |

(Continued)

*Primary Examiner* — Ryan C Vaughn
*Assistant Examiner* — Em N Trieu
(74) *Attorney, Agent, or Firm* — NORTON ROSE FULBRIGHT US LLP

(57) ABSTRACT

A method of training a machine learning system for an object recognition device. The method includes: providing sensing element data; and training a machine learning system, using the provided sensing element data; at least one object being recognized from the sensing element data; and signal intensities of the sensing element data being used together with a reflection and/or absorption factor associated with the object.

14 Claims, 3 Drawing Sheets

(56)           References Cited

U.S. PATENT DOCUMENTS

| 2019/0176684 | A1* | 6/2019 | Zych | G06V 20/58 |
| 2020/0019161 | A1* | 1/2020 | Stenneth | G08G 1/096725 |
| 2020/0081134 | A1* | 3/2020 | Wheeler | G01S 19/396 |
| 2020/0396379 | A1* | 12/2020 | Guha | G01J 5/0859 |

FOREIGN PATENT DOCUMENTS

| CN | 110261868 A | 9/2019 |
| KR | 20090108960 A | 10/2009 |

* cited by examiner provide sensing
element data                    ~ 500 train machine learning
system                         ~ 510

METHOD OF TRAINING A MACHINE LEARNING SYSTEM FOR AN OBJECT RECOGNITION DEVICE

CROSS REFERENCE

The present application claims the benefit under 35 U.S.C. § 119 of German Patent Application No. DE 102019217225.3 filed on Nov. 7, 2019, which is expressly incorporated herein by reference in its entirety.

FIELD

The present invention relates to a method of training a machine learning system for an object recognition device. The present invention further relates to a method for carrying out object recognition, using a trained machine learning system. In addition, the present invention relates to an object recognition device including a machine learning system, which is trained with the aid of a method of training a machine learning system for an object recognition device. Furthermore, the present invention relates to a computer program product.

BACKGROUND INFORMATION

An autonomous vehicle is a vehicle, which gets along at least partially without a driver. In this context, the vehicle travels autonomously, for example, by detecting the course of a road, other road users, obstacles, etc., independently, and calculating the corresponding control commands in the vehicle and transmitting them to the actuators in the vehicle, through which a path of travel of the vehicle is controlled in a correct manner. In the case of a fully autonomous vehicle, a human driver is not involved in the driving action.

Vehicles currently available are not yet capable of acting fully autonomously. First of all, since the corresponding technology is not yet fully developed. Secondly, since today, it is still legally stipulated that the driver himself/herself must be able to intervene in the driving action at any time. Even today, it is foreseeable that in a few years, fully autonomous vehicle systems will come onto the market, as soon as the above-mentioned hurdles are overcome.

Driver assistance systems are supplementary electronic devices in motor vehicles for supporting the driver in certain driving situations; safety aspects, but also an increase in riding comfort, being often in the fore. Driver assistance systems intervene semiautonomously or autonomously in the drive unit, control (e.g., gas, brake), or signaling devices of the vehicle and warn the driver shortly prior to, or during, critical situations, using suitable human-machine interfaces.

SUMMARY

An object of the present invention is to provide an improved method for recognizing objects.

According to a first aspect of the present invention, the object may achieved by an example method of training a machine learning system for an object recognition device, including the steps:

provides sensing element data; and training a machine learning system, using the provided sensing element data; at least one object being recognized from the sensing element data; signal intensities of the sensing element data being used together with a reflection and/or absorption factor associated with the object.

In contrast to the related art, sensing element data are presently understood to be the non-postprocessed data of a sensing element, such as a surround sensor system. This means, in particular, that information about signal intensities and/or reflection characteristics of the reflecting objects is present in the sensing element data. In this manner, by taking signal intensities and/or reflection characteristics into account, object recognition may be improved considerably. Through this, for example, the object recognition device may distinguish between objects in the form of a tree or a lamp post. This is achieved due to the fact that metallic surfaces or a wall or a person, etc., have different reflection and/or absorption characteristics, which may be readily distinguished from each other because of this. As a result, due to this, training of the machine learning system is carried out on the basis of reflection characteristics of the reflecting objects.

In this manner, an offline training phase is provided, which provides, as a result, a trained machine learning system in the form of a recognition device, for subsequent use in a surround sensor system for recognizing objects.

According to a second aspect of the present invention, the object may be achieved by example methods for carrying out object recognition, using a machine learning system trained in accordance with a proposed method.

According to a third aspect of the present invention, the object may be achieved by an object detection device having a machine learning system, which is trained with the aid of a proposed method.

According to a fourth aspect of the present invention, the object may be achieved by a computer program product, which includes commands that, in response to the execution of the computer program by a computer, cause it to implement a proposed method; or which is stored in a machine-readable storage medium.

Advantageous further refinements of the method in accordance with the present invention are described herein.

In one advantageous further refinement of the example method, the machine learning system is trained in a selected environment; a known object being irradiated by the emitting sensor device, and radiation reflected by the object being received; the object being recognized on the basis of the radiation reflected by the object. This allows a type of "static learning" to be achieved, in which different reflections of varied surfaces may be learned. In this manner, for example, specific types of objects may be used for training the machine learning system.

In another advantageous further refinement of the example method, in order to provide the sensing element data, the emitting sensor device remains static or is moved in relation to the objects. In this manner, a stream of images may be detected, through which objects may be tracked and a learning effect is consequently improved.

Another advantageous further refinement of the example method provides that, additionally or alternatively, a feature map be used for ascertaining the object from the sensing element data; a reflection factor and/or an absorption factor of objects being stored in the feature map. Using the highly precise feature map, e.g., objects may be located relative to the vehicle. This is possible with the aid of a GNSS-based sensor device, which knows its position in the world highly precisely, or via a position solution based on a feature map. In this manner, positions of objects may be assigned spatially in a more effective manner. Due to this, knowledge of a position of an object may be combined with knowledge of characteristics of the object. In this manner, it is also advantageously possible to train the object recognition device during continuous operation.

In another advantageous further refinement of the example method, the training of the machine learning system is carried out with the aid of sensing element data retrieved in different weather conditions. This allows objects to be portrayed in an even more multifaceted manner in different weather conditions and, therefore, to be recognized even more effectively.

In another advantageous further refinement of the example method, interference in the sensing element data is filtered. In this manner, object data not having interference are known, since interference has been filtered out of the data of the sensing elements. Due to this, interference may be advantageously distinguished from actual objects, which may advantageously accelerate the learning progress of the machine learning system. This may allow objects to be recognized even more effectively and accurately.

In another advantageous further refinement of the example method, a selection of the data of the detected objects is used for training a downstream machine learning system. This may allow a conventional algorithm to be sped up; with the aid of the downstream learning system, regions in image data being used in a completely targeted manner for providing a type of classification device. In this connection, for example, the downstream machine learning system may be trained to implement the classification device. Due to this, objects (e.g., road users) may advantageously be recognized even more rapidly and more reliably, since a region of the image, in which they may be located, has been narrowed down in advance.

In one variant of the example method, reflection data of at least one object are stored in the feature map. Because of this, e.g., for selected objects, a certain, associated reflection and absorption factor for a particular type of sensor is stored in the feature map. In the closed-loop control mode of the emitting sensor device, this may allow a recognition accuracy of objects to be increased in an advantageous manner.

In the following, the present invention, including further features and advantages, is described in detail in light of a number of figures. In this context, identical or functionally equivalent elements have the same reference numerals.

Method features described follow analogously from corresponding device features described, and vice versa. In particular, this means that features, technical advantages and explanations regarding the method follow in an analogous manner from corresponding explanations, features, and advantages regarding the object recognition device, and vice versa.

BRIEF DESCRIPTION OF EXAMPLE EMBODIMENTS

Figure 1:
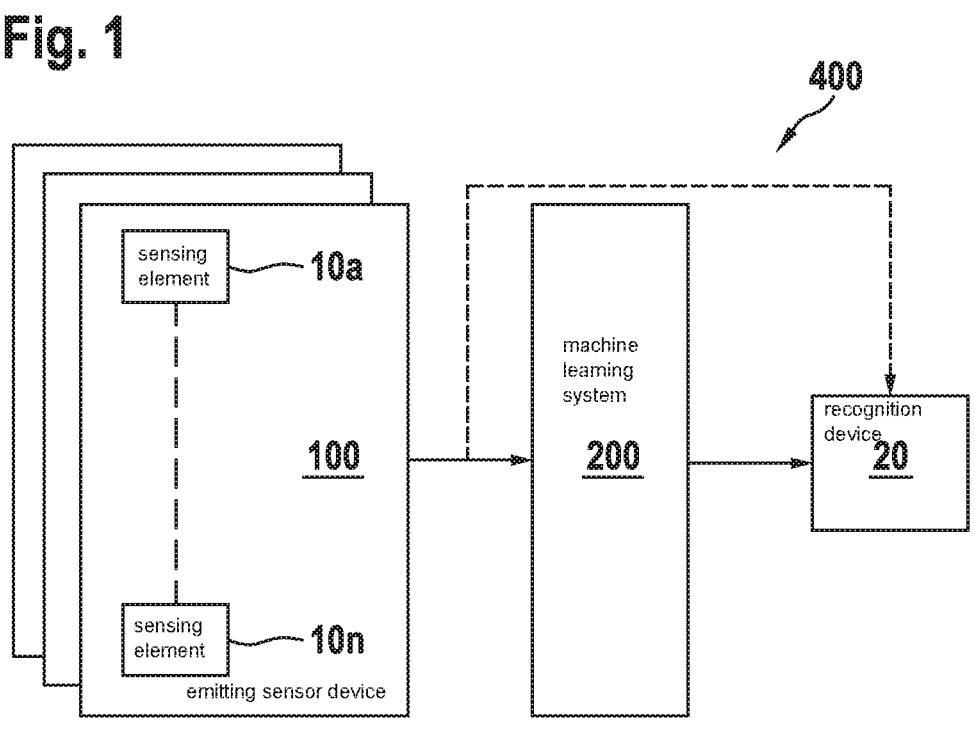
FIG. 1 show a basic representation of a specific embodiment of a method in accordance with the present invention.

In accordance with the present invention, a device and a method are provided for improved recognition of objects with the aid of an emitting, that is, active, surround sensor (e.g., radar, lidar, ultrasonic, etc.), for use, e.g., in an automated or autonomous vehicle. In the following, "sensing element data" are to be understood as signal intensities of individual pixels of sensing elements.

To that end, at least one machine learning system, preferably, in the form of a neural network, is used in order to extract objects from surround sensor data. However, in the proposed method, not every pixel of the surround sensor is evaluated equally, as conventionally intended, but in addition, different characteristics of different surfaces of different objects (e.g., reflection factor, absorption factor) are also incorporated for training the machine learning system, in order to improve the object recognition. The machine learning system preferably takes the form of an artificial neural network and, in the trained state, represents an "intelligent algorithm" including learned parameters and/or weights.

Based on the sensing element data, the machine learning system provided for that purpose to improve object recognition is trained for different surfaces and reflections at the surfaces of the objects. As a result, this means that the machine learning system is trained on the basis of the following input data:

sensing element data of at least one surround sensor;

defined environment of the surround sensor, including specific structures and objects, which have different reflection factors and reflection characteristics. In this context, the attitudes and positions of the objects relative to the surround sensor and/or the layers and surface characteristics of these objects are inside the surround sensor data and/or are known in the machine learning system.

Thus, the machine learning system, that is, the artificial intelligence, learns object recognition, so to speak, based on the reflections by defined structures and objects relative to the surround sensor, instead of, as customary today, by tagging the objects in the image data of the surround sensors, which, generally, requires complicated and expensive manual labor.

In one variant of the example method in accordance with the present invention, an emitting sensor device 100 (e.g., lidar sensor, radar sensor, ultrasonic sensor) is trained within a defined environment. For example, a further road user is situated within a lidar image; the attitude and position of the road user within the lidar data and/or in the region of the sensor, relative to the lidar sensor, being known.

At this point, the machine learning system learns the object recognition on the basis of the reflections of, precisely, the object at, precisely, this position. After the learning operation, the machine learning system is able to extract the characteristic object features of a further road user from the usual reflections of the lidar beams. This takes place on the basis of the unprocessed sensor data of the sensing element of the lidar sensor.

FIG. 1 shows a basic block diagram of a configuration of an object recognition device 400, that is, the training of a machine learning system 200 for providing an object recognition device 400. As shown, one or more emitting sensor devices 100 include sensing elements (pixel elements) 10a, . . . , 10n, by which radiation reflected by objects is received. At the output of sensor device 100, the data received in this manner, including their signal intensities, that is, in view of reflection and absorption factors of the objects, are transmitted to machine learning system 200, which is trained to provide, as a result, a recognition device 20 for subsequent use in sensor device 100. Using the result of trained machine learning system 200 in the form of recognition device 20, object recognition device 400 is configured for an operational normal mode (e.g., in an autonomous vehicle).

A dashed arrow between sensor device 100 and recognition device 20 indicates the use of object recognition device 400 with the data acquired by sensor device 100.

In one specific embodiment of the example method, not only are the object characteristics learned by machine learning system 200, but also different types of reflection and/or scattering and signal intensities of the reflected beams are learned, in order to recognize different objects.

For example, metallic surfaces are learned, in such a manner, by an emitting sensor device 100 taking the form of a radar sensor, that object recognition device 400 (e.g., of a radar sensor) is subsequently able to detect the metallic surfaces correctly. In this manner, for example, instances of absorption at certain surfaces may be compensated for or detected, and nevertheless, certain object characteristics may be derived from this, which may be used in further surround sensors or in a surround-sensor object fusion device for improved object recognition.

In further specific embodiments of the present invention, the training of machine learning system 200 takes place either statically or dynamically. In the case of static training of machine learning system 200, emitting sensor device 100 for supplying the sensor element data is situated at a fixed position, while the objects to be learned are positioned statically about emitting sensor device 100, as well.

On the other hand, in the case of dynamic training of machine learning system 200, either emitting sensor device 100, or the objects in the surrounding area of emitting sensor device 100 that are to be trained, are moved dynamically. An important advantage of this is that within machine learning system 200, a stream of images of objects and/or their reflections may also be learned, as well.

Figure 2:
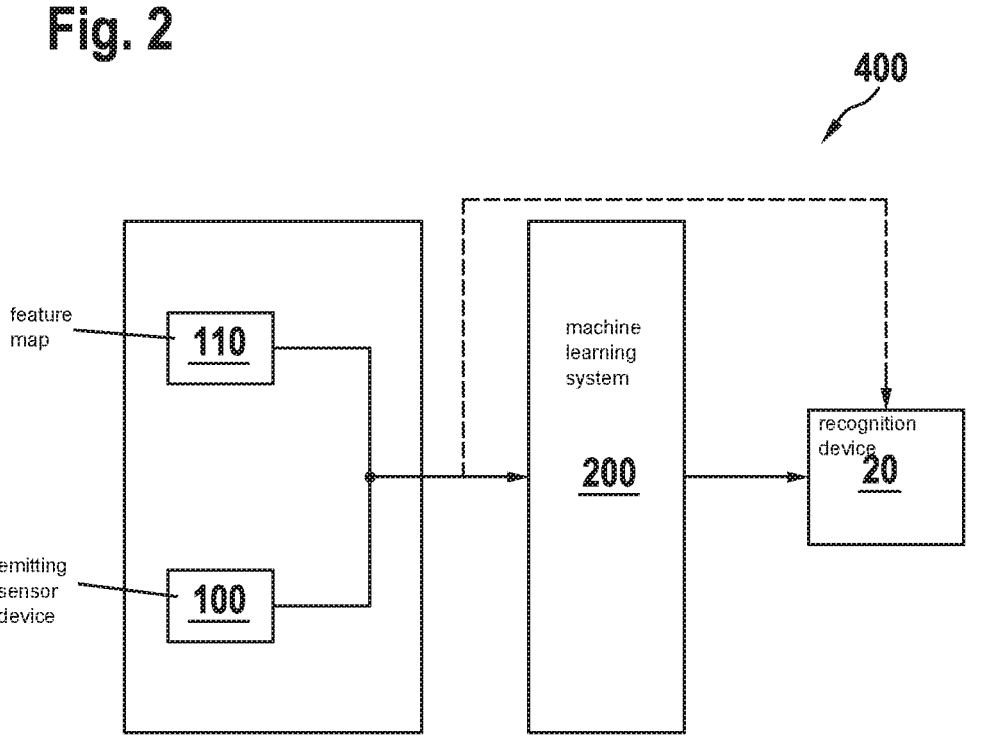
FIG. 2 shows a block diagram of an example object recognition device in accordance with the present invention.

In a further variant of the example method, a feature map 110 may be used additionally or alternatively for the training of machine learning system 200 (see FIG. 2). In this case, for example, an autonomous vehicle having certain surround sensors is moving in an urban area. The training of machine learning system 200 with regard to object recognition takes place in light of the highly accurate position and orientation of the vehicle (provided, e.g., with the aid of a GNSS-based sensor), as well as in light of the objects located on feature map 110 and their positions relative to the vehicle and the surround sensors. In this context, the data, structures and objects of feature map 110 are transformed to the surround-sensor coordinate system, so that each time, sensor device 100 knows the position in the reference image, at which a certain object is to be expected.

Using the data of emitting sensor device 100, the reference machine learning system 200 is now trained on the basis of the relative positions of the surrounding objects and their characteristic reflections. FIG. 2 shows a basic block diagram of this variant, where it is apparent that data for training the machine learning system 200 are now contributed by feature map 110, as well.

In further variants of the example method, machine learning system 200 is trained for improved object recognition in varied weather conditions, different scenarios, as well as in different variants of vehicles, etc.

In a further variant of the example method, machine learning system 200 is trained for different objects.

In variants of object recognition device 400, a table including reflection and/or absorption factors is used for providing the reflection and/or absorption data of objects, which are then used together with the image data. As an alternative, recognition device 20 may be hard-coded.

In one variant of the example method, data of known objects, whose reflected signal intensities are known, may also be used to recognize the object from the sensing element data.

In a further variant of the example method, machine learning system 200 is used for implementing improved object recognition, by filtering out interference in sensing element 10a, . . . , 10n, which would result in poor object recognition. For example, corresponding machine learning system 200 is trained to filter out scattering or interference in the sensing element data, before the actual object recognition is carried out with the aid of the filtered sensing element data. To that end, for example, an expected signal intensity from a previous measurement of a known surface may be compared to a measured signal intensity of a similar object; the difference being interpreted as scattering and therefore being discarded.

In one variant of object recognition device 400, feature map 110 is also used in the closed-loop control mode of the vehicle, in order to improve the object recognition (not shown). For example, the vehicle is located highly accurately (e.g., with the aid of a GNSS sensor), and the surrounding structures are transformed to the corresponding surround-sensor coordinate system. Emitting sensor device 100 now "knows" the image positions, at which certain objects are to be expected, which means that machine learning system 200 is now able to recognize these objects even more reliably with the aid of training previously carried out on these objects.

In this variant, it is also possible for the structures and buildings at a particular position in the world to be stored within feature map 110 with particular reflection factors for particular types of surround sensors. In this manner, object recognition device 400 already "knows," prior to the recognition of an object, the reflections and interference, which are expected at this object, and incorporates this information into its own object recognition, as well, with the aid of trained machine learning system 20.

In a further variant of the example method, machine learning system 200, which recognizes objects from the unprocessed sensor image data, is used for recognizing relevant image regions including particular object types. As is customary today, the object recognition is subsequently carried out in a downstream machine learning system 300 on the basis of the surround sensor data; reference being made to the image regions from upstream machine learning system 200, which include particular object types. In this manner, an available object recognition, which has been trained on tags in image data, is improved with the aid of the relevant image regions of the upstream and proposed machine learning system 200.

Figure 3A:
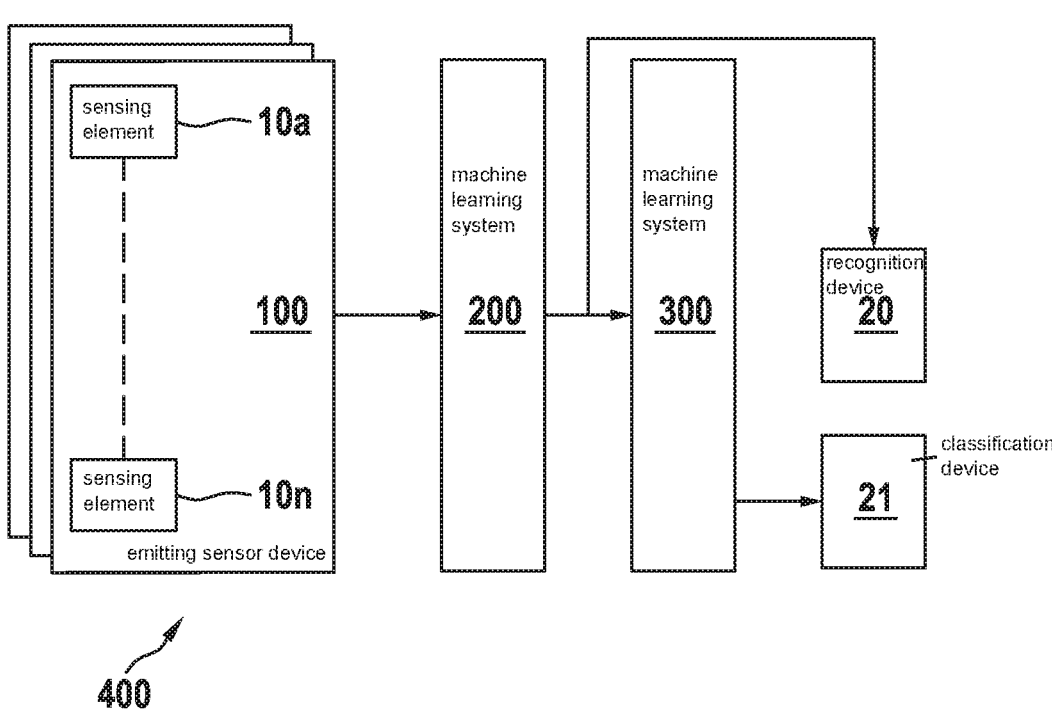
FIGS. 3a, 3b show basic representations of a further specific embodiment of the example method in accordance with the present invention, in different stages.

A basic representation of a configuration of an object recognition device 400 for a learning phase is shown in FIG. 3a. In this case, it is apparent that both machine learning system 200 and downstream machine learning system 300 are used for training recognition device 20 and classification device 21.

Figure 3B:
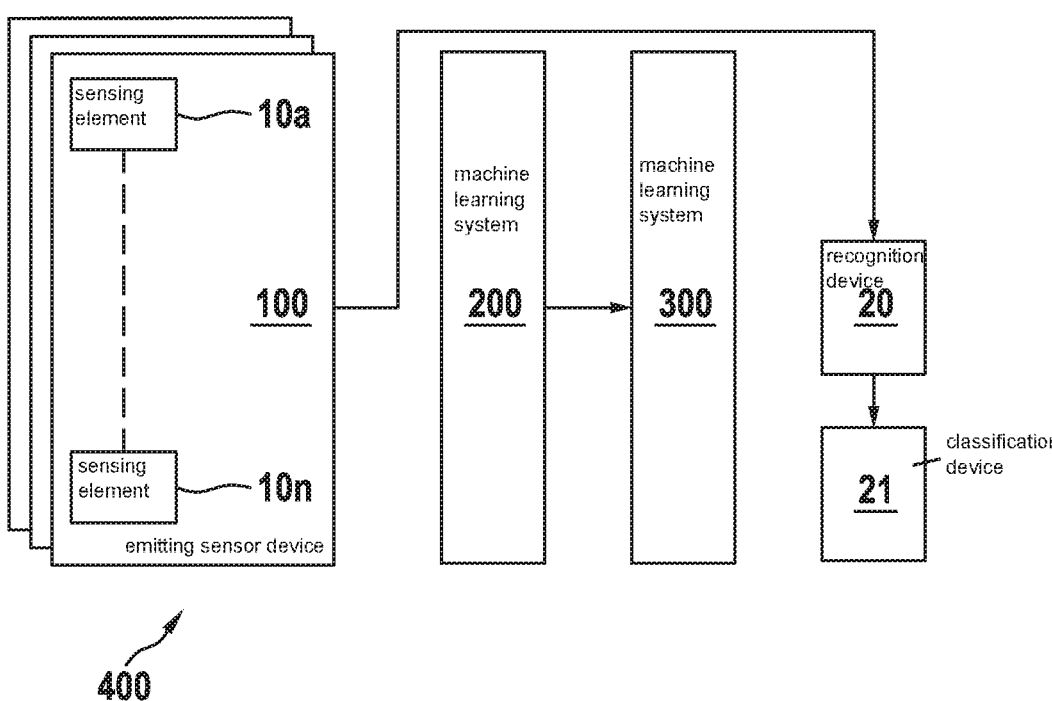

A basic representation of a configuration of the object recognition device from FIG. 3a, for a subsequent execution phase, is shown in FIG. 3b. In this case, it is apparent that the output data of sensor device 100 is supplied to recognition device 20 and to classification device 21. Consequently, in the closed-loop control mode of object recognition device 400, recognition device 20 and classification device 21 are connected in series; the recognition device and the classification device then making reference to each other for the object recognition.

Emitting sensor device 100 may be a radar, lidar or ultrasonic sensor.

Figure 4:
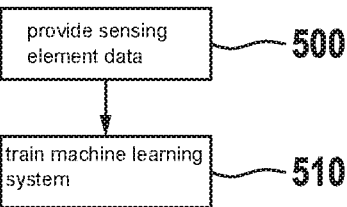
FIG. 4 shows a basic flow chart of the example method in accordance with the present invention.

FIG. 4 shows a basic flow chart of a proposed method of training a machine learning system 200 for an object recognition device 400.

In a step 500, sensing element data are provided.

In a step 510, a machine learning system is trained, using the provided sensing element data; at least one object being recognized from the sensing element data; in order to recognize the object, signal intensities of the sensing element data being used together with an associated reflection and/or absorption factor of the object.

The object recognition device 400 configured according to the present invention may be used in an autonomous vehicle, an airplane, a drone, a watercraft, etc. In this context, it is possible for object recognition device 400 to be situated directly in emitting sensor device 100, or also outside of it in a separate processing device (e.g., control unit, not shown).

Object recognition may advantageously be carried out even more reliably and accurately with the aid of the object recognition device 400 configured according to the present invention. While the object recognition is carried out directly on the sensing element data, along with signal intensities, interference or reflections may also be removed from the image data before the actual object recognition is carried out.

The improved object recognition by a surround sensor configured in this manner may allow safety in road traffic to be increased markedly, above all, in the operation of autonomous vehicles.

The method preferably takes the form of a computer program, which includes program code means for executing the method on machine learning systems 200, 300. In this context, above-mentioned machine learning systems 200, 300 may be formed, for example, in a central control unit or in the cloud.

Although the present invention has been described above in light of concrete exemplary embodiments, going forward, one skilled in the art may also implement specific embodiments not described or only partially described, without departing from the essence of the present invention.

What is claimed is:

1. A method of training a machine learning system including a neural network for an object recognition device, the method comprising the following steps:

emitting radiation into an environment using a sensor device having a sensor device type including at least one of: a lidar sensor device, a radar sensor device, or an ultrasonic sensor device;

generating sensing element data based on radiation reflected off of a plurality of objects in the environment and received by the sensor device in response to emitting the radiation;

storing, prior to training the machine learning system, a feature map including locations of the plurality of objects in the environment, and for each object at least one of: a reflection factor describing a reflection characteristic of a surface of the object, or an absorption factor describing an absorption characteristic of the surface of the object;

wherein the plurality of objects includes at least a first object having a metallic surface and a second object having a non-metallic surface, the stored reflection factor and/or absorption factor for the first object having the metallic surface being different from the stored reflection factor and/or absorption factor having the non-metallic surface based on different reflection and/or absorption characteristics for the metallic and non-metallic surfaces;

wherein for each object the stored reflection factor and/or absorption factor is specific to the sensor device type of the sensor device; and training the machine learning system including the neural network to recognize the plurality of objects in the environment by providing inputs to the machine learning system including, for each object, (i) the sensing element data based on the radiation reflected from that object, (ii) the stored location of that object, and (iii) the stored reflection factor and/or absorption factor for that object.

2. The method as recited in claim 1, wherein the machine learning system is trained in a defined environment, wherein the training includes irradiating a known object by the emitting sensor device, and radiation reflected by the object is received, and the object is recognized based on the radiation reflected by the object.

3. The method as recited in claim 1, wherein to provide the sensing element data, the emitting sensor device remains static or is moved in relation to the at least one object.

4. The method as recited in claim 1, wherein the feature map is used for ascertaining the at least one object from the sensing element data, and the reflection factor and/or an absorption factor of the at least one object is stored in the feature map.

5. The method as recited in claim 1, wherein the machine learning system is trained with using sensing element data provided in different weather conditions.

6. The method as recited in claim 1, wherein interference in the sensing element data is filtered.

7. The method as recited in claim 1, wherein a selection of the data of the recognized objects is used for training a downstream machine learning system.

8. A method for carrying out object recognition, the method comprising:

storing, prior to training a machine learning system including a neural network, a feature map including locations of a plurality of objects in an environment, and for each object at least one of: a reflection factor describing a reflection characteristic of a surface of the object, or an absorption factor describing an absorption characteristic of the surface of the object;

wherein the plurality of objects includes at least a first object having a metallic surface and a second object having a non-metallic surface, the stored reflection factor and/or absorption factor for the first object having the metallic surface being different from the stored reflection factor and/or absorption factor having the non-metallic surface based on different reflection and/or absorption characteristics for the metallic and non-metallic surfaces;

wherein for each object the stored reflection factor and/or absorption factor is specific to a sensor device type of s sensor device; and performing the object recognition using the machine learning system including the neural network, the machine learning system trained by:

emitting radiation into an environment using the sensor device having the sensor device type including at least one of: a lidar sensor device, a radar sensor device, or an ultrasonic sensor device;

generating sensing element data based on radiation reflected off of the plurality of objects in the environment and received by the sensor device in response to emitting the radiation; and training the machine learning system including the neural network to recognize the plurality of objects in the environment by providing inputs to the machine learning system including, for each object, (i) the sensing element data based on the radiation reflected from that object, (ii) the stored location of that object, and (iii) the stored reflection factor and/or absorption factor for that object.

9. The method as recited in claim 8, wherein the trained machine learning system is used to compare relevant image regions of the sensing element data to object types, object recognition based on the sensing element data is carried out in a downstream machine learning system, and reference is made to the relevant image regions.

10. An object recognition device, comprising:

a non-transitory machine readable storage medium to store a feature map including locations of a plurality of objects in an environment, and for each object at least one of: a reflection factor describing a reflection characteristic of a surface of the object, or an absorption factor describing an absorption characteristic of the surface of the object;

wherein the plurality of objects includes at least a first object having a metallic surface and a second object having a non-metallic surface, the stored reflection factor and/or absorption factor for the first object having the metallic surface being different from the stored reflection factor and/or absorption factor having the non-metallic surface based on different reflection and/or absorption characteristics for the metallic and non-metallic surfaces;

wherein for each object the stored reflection factor and/or absorption factor is specific to a sensor device type of a sensor device; and a machine learning system including a neural network to perform object recognition using the stored feature map including reflection factors and/or absorption factors, the machine learning system being trained to recognize the objects in the environment based on signal intensities of sensing element data and the reflection factors and/or absorption factors of the stored feature map by:

emitting radiation into an environment using the sensor device having the sensor device type including at least one of: a lidar sensor device, a radar sensor device, or an ultrasonic sensor device;

generating sensing element data based on radiation reflected off of the plurality of objects in the environment and received by the sensor device in response to emitting the radiation; and training the machine learning system including the neural network to recognize the plurality of objects in the environment by providing inputs to the machine learning system including, for each object, (i) the sensing element data based on the radiation reflected from that object, (ii) the stored location of that object, and (iii) the stored reflection factor and/or absorption factor for that object.

11. The object recognition device as recited in claim 10, wherein the object recognition device is situated on an emitting sensor device or outside of the emitting sensor device.

12. An object recognition device, comprising:

an emitting sensor device;

a stored feature map including locations of a plurality of objects in an environment, and for each object at least one of: a reflection factor describing a reflection characteristic of a surface of the object, or an absorption factor describing an absorption characteristic of the surface of the object;

wherein the plurality of objects includes at least a first object having a metallic surface and a second object having a non-metallic surface, the stored reflection factor and/or absorption factor for the first object having the metallic surface being different from the stored reflection factor and/or absorption factor having the non-metallic surface based on different reflection and/or absorption characteristics for the metallic and non-metallic surfaces;

wherein for each object the stored reflection factor and/or absorption factor is specific to a sensor device type of a sensor device; and a machine learning system including a neural network trained to perform object recognition using the stored feature map including reflection factors and/or absorption factors, the machine learning system being trained to recognize the objects based on signal intensities of training sensing element data and the reflection factors and/or absorption factors for the objects by:

emitting radiation into an environment using the sensor device having the sensor device type including at least one of: a lidar sensor device, a radar sensor device, or an ultrasonic sensor device;

generating sensing element data based on radiation reflected off of the plurality of objects in the environment and received by the sensor device in response to emitting the radiation; and training the machine learning system including the neural network to recognize the plurality of objects in the environment by providing inputs to the machine learning system including, for each object, (i) the sensing element data based on the radiation reflected from that object, (ii) the stored location of that object, and (iii) the stored reflection factor and/or absorption factor for that object.

13. A non-transitory machine-readable storage medium on which is stored a computer program for training a machine learning system including a neural network for an object recognition device, the computer program, when executed by a computer, causing the computer to perform the following steps:

providing sensing element data for objects in an environment;

storing, prior to training the machine learning system, a feature map including locations of a plurality of objects in an environment, and for each object at least one of: a reflection factor describing a reflection characteristic of a surface of the object, or an absorption factor describing an absorption characteristic of the surface of the object;

wherein the plurality of objects includes at least a first object having a metallic surface and a second object having a non-metallic surface, the stored reflection factor and/or absorption factor for the first object having the metallic surface being different from the stored reflection factor and/or absorption factor having the non-metallic surface based on different reflection and/or absorption characteristics for the metallic and non-metallic surfaces;

wherein for each object the stored reflection factor and/or absorption factor is specific to a sensor device type of a sensor device; and training the machine learning system to recognize the objects in the environment based on signal intensities of the provided sensing element data and the reflection factors and/or absorption factors for the objects from the stored feature map by:

emitting radiation into an environment using the sensor device having the sensor device type including at least one of: a lidar sensor device, a radar sensor device, or an ultrasonic sensor device;

generating sensing element data based on radiation reflected off of the plurality of objects in the environment and received by the sensor device in response to emitting the radiation; and training the machine learning system including the neural network to recognize the plurality of objects in the environment by providing inputs to the machine learning system including, for each object, (i) the sensing element data based on the radiation reflected from that object, (ii) the stored location of that object, and (iii) the stored reflection factor and/or absorption factor for that object.

14. The method as recited in claim 1, further comprising:

training the machine learning system to filter out scattering or interference in the sensing element data based on comparing, for each object, an expected signal intensity according to the reflection factor and/or absorption factor of the surface of the object to the signal intensity of the sensing element data for the object.

* * * * *